Sept. 27, 1932.  F. J. GIBBONS  1,879,182
SHOCK ABSORBER
Filed Oct. 8, 1929  2 Sheets-Sheet 1

Inventor
Frank J. Gibbons
By Attorneys
Southgate Fay & Hartley

Sept. 27, 1932.  F. J. GIBBONS  1,879,182

SHOCK ABSORBER

Filed Oct. 8, 1929  2 Sheets-Sheet 2

Witness
W. McKeon

Inventor
Frank J. Gibbons
By Attorneys
Southgate Fay & Hawley

Patented Sept. 27, 1932

1,879,182

UNITED STATES PATENT OFFICE

FRANK J. GIBBONS, OF WORCESTER, MASSACHUSETTS

SHOCK ABSORBER

Application filed October 8, 1929. Serial No. 398,208.

This invention relates to a shock absorber of the oscillating hydraulic type.

The principal objects of the invention are to provide means for imparting a maximum resistance with the fewest mechanical parts; to provide valves operating to remove the air from a non-resistance chamber instead of the double working chamber, thus preventing loss of oil and lost motion; to provide a construction in which the two work chambers can be made in one piece, thus reducing the cost of manufacture and preventing leaks; to provide means for cutting down the loss of fluid from the working chamber, thus increasing the resistance; to provide a type of safety valves in the upper and lower working chambers to cause the pressure to break at different intensities in the two chambers, and to provide means whereby the no resistance chamber will not operate as a no resistance chamber until all the air is driven out of the working chamber, making it impossible for the fluid to pass from the working chamber to the non-resistance chamber.

Other objects and advantages of the invention will appear hereinafter.

Reference is to be had to the accompanying drawings in which

Figure 1:
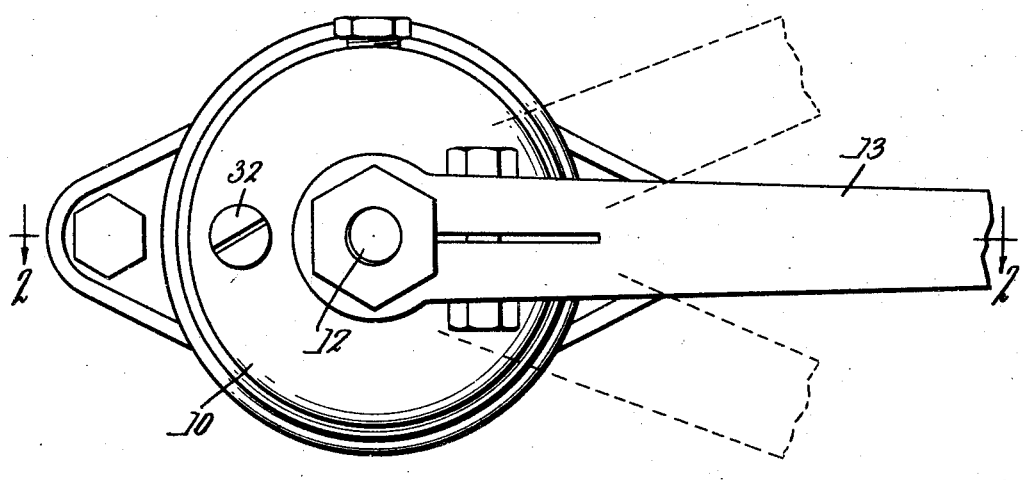
Fig. 1 is an end view of a shock absorber constructed in accordance with this invention.
Figure 2:
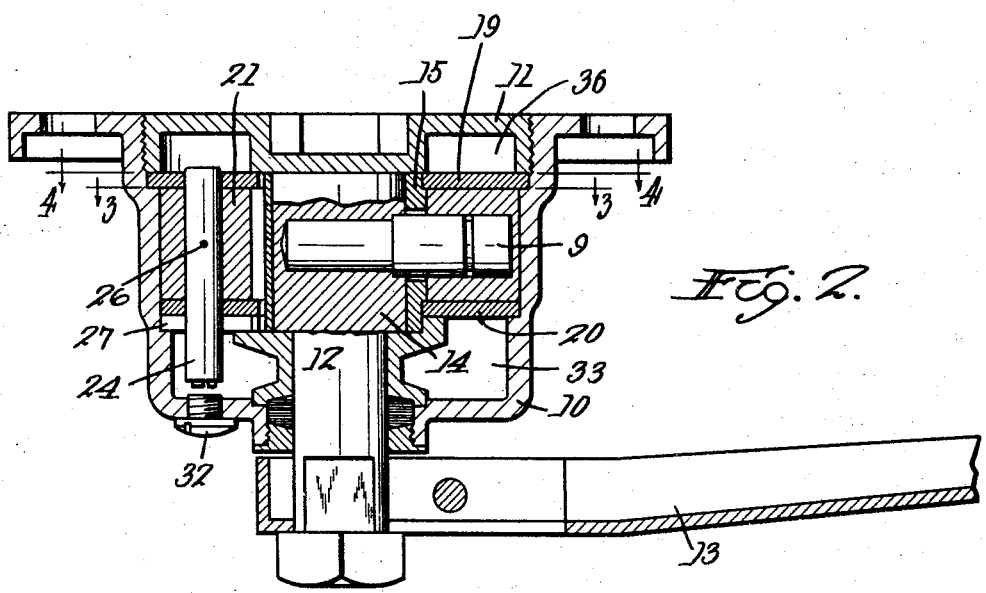
Fig. 2 is a diametrical sectional view on the horizontal line 2—2 of Fig. 1.
Figure 3:
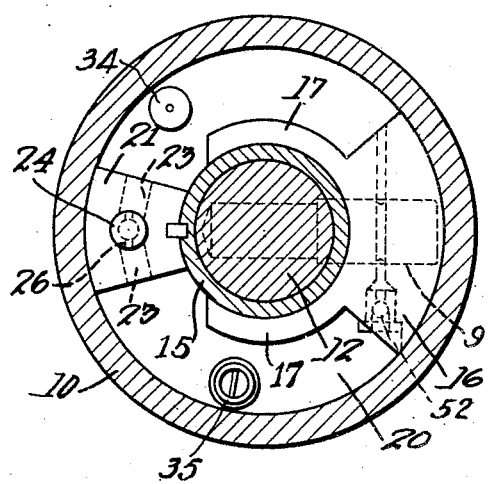
Fig. 3 is a sectional view of the working chambers on the line 3—3 of Fig. 2 and looking in the direction of the arrows.
Figure 4:
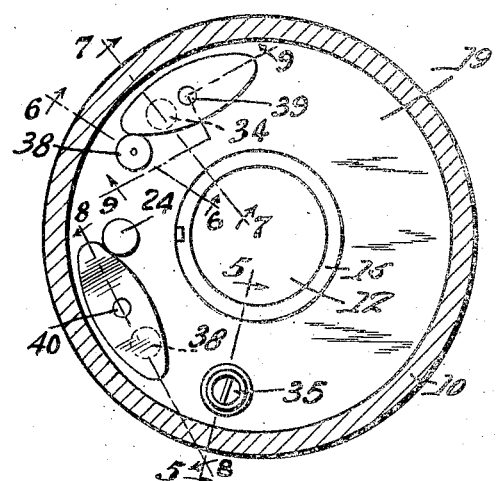
Fig. 4 is an inverted sectional view on the line 4—4 of Fig. 2 looking in the direction of the arrows.
Figure 5:
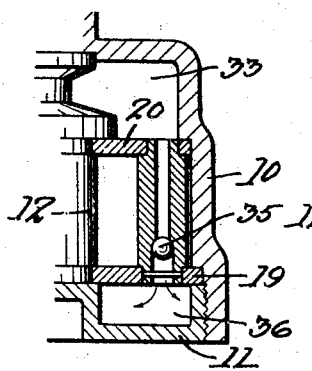
Fig. 5 is a sectional view on the radial line 5—5 of Fig. 4.
Figure 6:
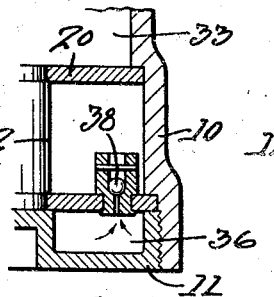
Fig. 6 is a sectional view on the line 6—6 of Fig. 4.
Figure 7:
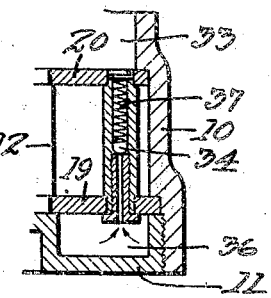
Fig. 7 is a sectional view on the radial line 7—7 of Fig. 4.
Figure 8:
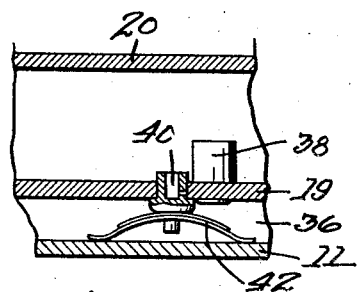
Fig. 8 is a sectional view on the line 8—8 of Fig. 4.
Figure 9:
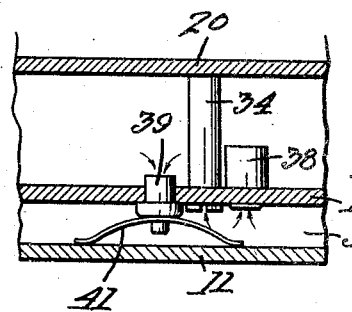
Fig. 9 is a sectional view on the line 9—9 of Fig. 4.

I have shown this shock absorber as comprising a casing 10 adapted to be secured to the chassis of an automobile or in any desired place and having an opening in its end in which is secured a binding nut 11 for holding the parts in place. The casing is in one piece of pressed or cast metal, thus avoiding expense in construction and leakage. At one end this casing has a reservoir or chamber 33. The casing 10 is provided with a cylindrical chamber therein in which most of the parts are located. Concentrically located within this chamber is the horizontal work shaft 12 which is provided with a split and bolted arm 13 connected with a relatively movable part of the car so as to be turned up and down when the car receives a jar or vibration.

This shaft 12 is provided with a hub 14 reaching to the nut 11 and cylindrical in shape on which hub is a sleeve 15 which is not keyed to the hub or shaft but is free thereon but is fixed in position otherwise. The outer circumference of this sleeve is finished and constitutes a bearing for the moving wing 16 of the apparatus. This wing has a pair of flanges 17 and is turned or ground inside to fit the sleeve on which it has its bearing.

On account of this construction the pressure exerted on the shaft 12 by the oscillating piston or wing 16 is reduced and the bearing surface of the latter is increased in area. The shaft 12 is provided with a pin 9 which extends through an arcuate slot in the fixed sleeve 15, this slot extending nearly half way around the sleeve. The pin is fixed in the wing or piston 16 so that this part is fixed to the shaft by the pin and has a bearing on the stationary sleeve outside the shaft.

The wing 16 operates in the double work chamber which is bounded on one end by a rear partition 19 and on the other end by a front partition 20, both annular in form and both ground to finish them properly for the sliding motion of the wing 16. The rear partition is set into the casing between its wall and a notch in the end of the fixed sleeve 15. The front partition 20 is set on a shoulder on the sleeve 15 and behind a shoulder in the casing.

In the cylindrical space in the casing on one side is located an interrupter 21. This is a sector shaped member. This interrupter 21 is secured in stationary position to the sleeve 15. This interrupter and the wing 16 divide the central chamber into an upper and a lower working chamber.

The interrupter 21 is provided with a passage 23 therethrough from one side to the other. In this passage is a by-pass screw valve 24 for regulating the passage of liquid back and forth through ports 26 in the valve. This valve is reached for adjustment through an opening closed by a screw plug 32. The valve 24 is held in position by entering holes in the partitions 19 and 20 and by a check nut 27.

The binding nut 11 is recessed to form an annular equalizing chamber 36 not under pressure. The liquid goes from the chamber 33 to the chamber 36, through a valve 35, passing through the lower work chamber. The air is let out of the chamber 36 into the chamber 33 at the top through an expansion vent valve 34 which is provided with a spring 37 normally holding the valve closed. The liquid then goes to the working chambers from the chamber 36 through valves 38 which are located in the partition 19. The no resistance chamber thus keeps both working chambers full of liquid and free from air which in turn prevents air bubbles or loss of liquid and lost motion.

In the upper and lower working chambers into which the working chamber is divided by the interrupter and wing, are two safety valves 39 and 40, both adapted to open under excessive pressure into the vacuum chamber 36. They are located of course in the partition 19. These two valves are provided with springs 41 and 42 respectively, the latter being stronger than the former. These springs are designed so that the valve 39 will open and allow the oil to escape from the upper working chamber into the chamber 36 at a low pressure, of say 200 pounds, while the spring 42 will break or yield to allow the escape of oil from the lower working chamber at a higher pressure, as for example 800 pounds, depending on the amount of spring tension placed on the valves. In other words, they are adjustable to suit the conditions. The air and expansion valves 38 and 34 are designed to remove the air from the no-resistance chamber 36 instead of the upper working chamber, thus preventing loss of oil and lost motion.

In the moving wing 16 is a passage to control the pressure in the upper working chamber by means of a check valve 52 so that the pressure in the upper working chamber will always be less than that in the lower working chamber.

It will be understood that, as the wing 16 moves back and forth, any deficiency in oil in the working chambers will be compensated for by the introduction of oil through the valves 38 from the chamber 36.

The oscillation of the part to which the arm 13 is connected will swing the shaft 12 and consequently the wing 16 back and forth. In each case the oil or liquid passing from one side to the other is restricted by the port 26 and this restriction is the same on both the upward and the downward stroke. The operation therefore will be obvious.

Either side of the working chamber in which the wing 16 oscillates will be supplied when necessary by oil from the reservoir 33 through these valves no matter what the pressure might be. There is no chance of oil passing through the base 21 except through the port 26.

Although I have illustrated and described only one form of the invention, I am aware of the fact that modifications can be made therein by any person skilled in the art without departing from the scope of the invention as expressed in the claims. Therefore I do not wish to be limited in this respect, but what I do claim is:—

1. In a shock absorber, the combination with a casing in a single integral piece adapted to be secured in fixed position and containing a work chamber, of a shaft in the casing, an interrupter on one side of said chamber in fixed position having a port therethrough for allowing liquid to pass, a stationary sleeve on the shaft, a wing oscillatably mounted on said sleeve in the working chamber, means carried by the shaft and projecting through the sleeve for operating the wing, and a nut removably secured in the end of the casing, said nut having a recess constituting an equalizing chamber and communicating with the work chamber.

2. In a shock absorber, the combination with a casing adapted to be secured to a fixed part and having a cylindrical interior constituting the work chamber and an oil reservoir, and a removable end containing a no resistance chamber, of a shaft centrally located with respect to the work chamber, an interrupter base on one side of said chamber fixed in position and having a port therethrough for allowing liquid to pass, a stationary sleeve on the shaft, a wing oscillatably mounted on said sleeve, a radial pin carried by the shaft for operating the wing and projecting through the sleeve, and means for securing the wing to the pin.

3. In a shock absorber, the combination with a casing adapted to be secured to a fixed part and having a cylindrical interior constituting the work chamber and an oil reservoir, and a removable end containing a no resistance chamber, of a shaft centrally located with respect to the work chamber, an interrupter base on one side of said chamber fixed in position and having a port therethrough for allowing liquid to pass, a stationary sleeve on the shaft, a wing oscillatably mounted on said sleeve, the wing and interrupter dividing the work chamber into two parts, a safety valve in each part of the work chamber for letting oil into the no resistance chamber, and springs of different resistances for holding said valves closed.

4. In a shock absorber, the combination with a base adapted to be secured to a fixed part and having a wall projecting therefrom and constituting a working chamber, of a shaft located in the working chamber, an interrupter on one side of said chamber in fixed position having a port therethrough for allowing liquid to pass, a stationary sleeve on the shaft, a wing oscillatably mounted on said sleeve, means carried by the shaft for operating the wing, said means projecting through the sleeve, opposite partitions in said chamber fixed in position to prevent passage of liquid thereby, a reservoir for liquid beyond one partition, ports through the other partition on each side of said wing and valves for controlling said ports to admit liquid into the working chambers and prevent its escape as the wing vibrates, to compensate for any loss of liquid.

5. In a shock absorber, the combination with a casing having a working chamber and an oil reservoir therein located in fixed position, and a no resistance chamber, of an interrupter fixed in the working chamber, a shaft in the working chamber, a stationary sleeve surrounding said shaft and engaging said interrupter, a port to allow the passage of liquid from the reservoir to the no resistance chamber, a free ball valve for controlling said port, a port for allowing air to pass from the no resistance chamber to the reservoir, and a spring closed valve for controlling the latter port, said sleeve having an arcuate slot therethrough, a pin carried by the shaft and projecting through said slot and an oscillatable wing to which said pin is connected, said wing having its bearing on said sleeve.

6. In a shock absorber, the combination with a working chamber and oil reservoir adapted to be fixed, of a shaft therein, a fixed sleeve on the shaft, an oscillatable wing fixed to the shaft and movable therewith, an arm on the shaft connected with a movable part of the machine for oscillating the shaft, an interrupter in fixed position filling the space between the side of the chamber opposite the wing, when the wing is in neutral position, and the sleeve, and dividing the working chamber, a no resistance chamber, means for conducting the oil from the reservoir into the no resistance chamber and then into the working chamber, said no resistance chamber being adapted to offer no resistance to the entry of oil into the working chamber when all the air is driven out of the working chamber, through the no resistance chamber and into the oil reservoir, and an air vent safety expansion valve through which the air passes to the oil reservoir.

7. In a shock absorber, the combination with a casing adapted to be secured to a fixed part and having a cylindrical interior constituting the work chamber and an oil reservoir, and a no resistance chamber, of a shaft, an interrupter base on one side of said chamber fixed in position and having a port therethrough for allowing liquid to pass, a stationary sleeve on the shaft, a wing oscillatably mounted on said sleeve, a radial pin carried by the shaft for operating the wing and projecting through the sleeve, and means for securing the wing to the pin.

8. In a shock absorber, the combination of two working oil chambers, one over the other, a movable wing therein connected with a movable part for contracting one and expanding the other, an oil reservoir, a no resistance chamber, a valve for admitting oil from the reservoir to the bottom of the no resistance chamber and preventing opposite flow of oil, a valve in each of the working chambers for admitting oil thereto from the no resistance chamber, and a vent at the top for allowing air to escape from the no resistance chamber into the reservoir.

In testimony whereof I have hereunto affixed my signature.

FRANK J. GIBBONS.